Patented May 2, 1933

1,906,972

UNITED STATES PATENT OFFICE

WILLIAM EDWARD KEMMERICH, OF NYACK, NEW YORK

ANTIFREEZING COMPOUNDS

No Drawing. Application filed September 6, 1929, Serial No. 390,841, and in Germany September 6, 1928.

The additions made to cooling brines to prevent water from freezing consist of inorganic salts which are dissolved therein and of organic liquids, such as alcohol, glycol, glycerin employed as such or added to water or a solvent. The inorganic salts are strongly hydrolyzed in aqueous solutions and therefore corrode metals and attack packings of the cooling system, and in case of only a partial evaporation of the water form crystals or crusts and cause clogging of the cooling system. Some of the organic antifreezing compounds as ethyl alcohol boil below the boiling point of water and therefore boil off not allowing an easy and exact control of the freezing point of the cooling brine, and attack rubber packings and rubber connecting tubes. Furthermore they are slowly oxidized through the continuous contact with air and form then organic acids, which are very corrosive to most metals.

My invention relates to antifreezing compounds, which do not possess these disadvantages. It has been found that urea and a great number of its derivatives represent an antifreeze by adding them in a sufficient quantity to a cooling brine. Urea dissolves in water very readily in the proportion 1:1, but it will not be necessary to use solutions of this concentration to protect for instance automobile-, airplane- or other motors from freezing up in a climate prevailing in the greater part of the United States.

A solution of 25 per cent of urea in water will have a freezing temperature of minus 11.5° centigrade, a 33% solution of urea of minus 15° centigrade etc. Urea solutions are neutral. Urea is not volatile at a temperature present in a motor cooling system. However in case the water of the solution would evaporate completely urea decomposes into gases ammonia and carbondioxide, so that the cooling system will not clog. Urea has furthermore a basic character, therefore neutralizing all acids possibly present in the brine. Urea does not attack metals nor rubber.

It has further been found that a great number of derivatives and condensation products of urea are more or equally suitable for this purpose. In the following I am giving some examples of these antifreezing mediums, but I do not limit myself to these compounds.

With glucose an ureid is formed of the formula:

$$C_7H_{14}O_6N_2 = H_2N.CO.N : CH.(CH(OH))_4 CH_2OH$$

This compound is extremely soluble in water and is superior to urea as an antifreeze. Galactose and urea form a similar condensation product forming a sirupy mass miscible with water in all proportions.

It is evident that other condensation products can result by the reaction between the amido group or both amido groups of the urea molecule with a number of the hydroxyl groups of alcohols and sugars; and it is expected that all these compounds will be practical antifreezing mediums.

It is further evident that valuable mixtures can be obtained by mixing two or more of urea derivatives or condensation products together, or by combining one or more with urea. Practical tests have been made with the ureide of glucose and an addition of 5% urea with the result that a 35% solution in water did not freeze at minus 25° centigrade and remained stable during several months. This shows that urea, urea derivatives and urea condensation products give complete protection, that these compounds are not volatile, that they do not attack metal or packings and rubber tubing. Other important features are that solutions of these bodies in water will not heat up the motor, will not affect paint or varnish, are not inflammable, are odorless and do not become viscous at low temperatures.

What I claim and desire to secure by Letters Patent is:

1. An antifreeze, consisting of a solution of urea, the urea being present from 10 to 45 parts in 100 parts of solution.

2. An antifreeze consisting of a solution of condensation products of urea with multivalent alcohols, these products being present from 10–45 parts in 100 parts of solution.

3. An antifreeze consisting of urea and products claimed in 2, the products and urea being present from 10–40 parts in 100 parts of solution.

Signed at Nyack, in the county of Rockland and State of New York, this fifth day of September A. D. 1929.

WILLIAM EDWARD KEMMERICH.